United States Patent

Söderkvist

[11] Patent Number: 5,251,483
[45] Date of Patent: Oct. 12, 1993

[54] PIEZOELECTRIC SENSOR ELEMENT INTENDED FOR A GYRO

[75] Inventor: Jan Söderkvist, Täby, Sweden

[73] Assignee: Swedish Ordnance-FFV/Bofors AB, Bofors, Sweden

[21] Appl. No.: 743,338

[22] PCT Filed: Feb. 20, 1990

[86] PCT No.: PCT/SE90/00112
§ 371 Date: Aug. 27, 1991
§ 102(e) Date: Aug. 27, 1991

[87] PCT Pub. No.: WO90/10196
PCT Pub. Date: Sep. 7, 1990

[30] Foreign Application Priority Data

Feb. 27, 1989 [SE] Sweden .............................. 8900666

[51] Int. Cl.⁵ .................................................. G01P 9/04
[52] U.S. Cl. ..................................................... 73/505
[58] Field of Search ................. 73/505; 310/329, 370

[56] References Cited

U.S. PATENT DOCUMENTS

| | | | |
|---|---|---|---|
| Re. 33,479 | 12/1990 | Juptner et al. ........................ | 73/505 |
| 4,628,734 | 12/1986 | Watson ................................. | 73/505 |
| 4,671,112 | 6/1987 | Kimura et al. ....................... | 73/505 |
| 4,674,331 | 6/1987 | Watson ................................. | 73/505 |

FOREIGN PATENT DOCUMENTS

| | | | |
|---|---|---|---|
| 61-191917 | 8/1986 | Japan .................................... | 73/505 |
| 63-42417 | 2/1988 | Japan .................................... | 73/505 |

Primary Examiner—John E. Chapman
Attorney, Agent, or Firm—Pollock, Vande Sande & Priddy

[57] ABSTRACT

A sensor element intended for a gyro, comprises an elongated body including at least one elongated element defining a tine and having a first and a second end. The first end is freely vibratable in two planes perpendicular to each other, designated as the X-Y plane and the Y-Z plane. The second end is fixedly secured in a body rotatable about a longitudinal axis which coincides with the planes. Drive and sensor electrodes are provided for piezoelectrically detecting vibrations of the first end, the drive electrodes providing vibrations in a plane perpendicular to the plane in which the sensor electrodes detect the vibrations, the drive and sensor electrodes covering substantial portions of the first vibratable end of the elongated element. The elongated element, at its second, fixedly secured end includes a transitional portion and an anchorage portion which do not participate in the vibration to any appreciable degree. The anchorage portion includes a connection which through connectors coupled to the connection means connects the sensor element to outer electronics. The elongated body including the elongated element, the transitional portion and the anchorage portion is manufactured as one common piece of piezoelectric material.

13 Claims, 5 Drawing Sheets

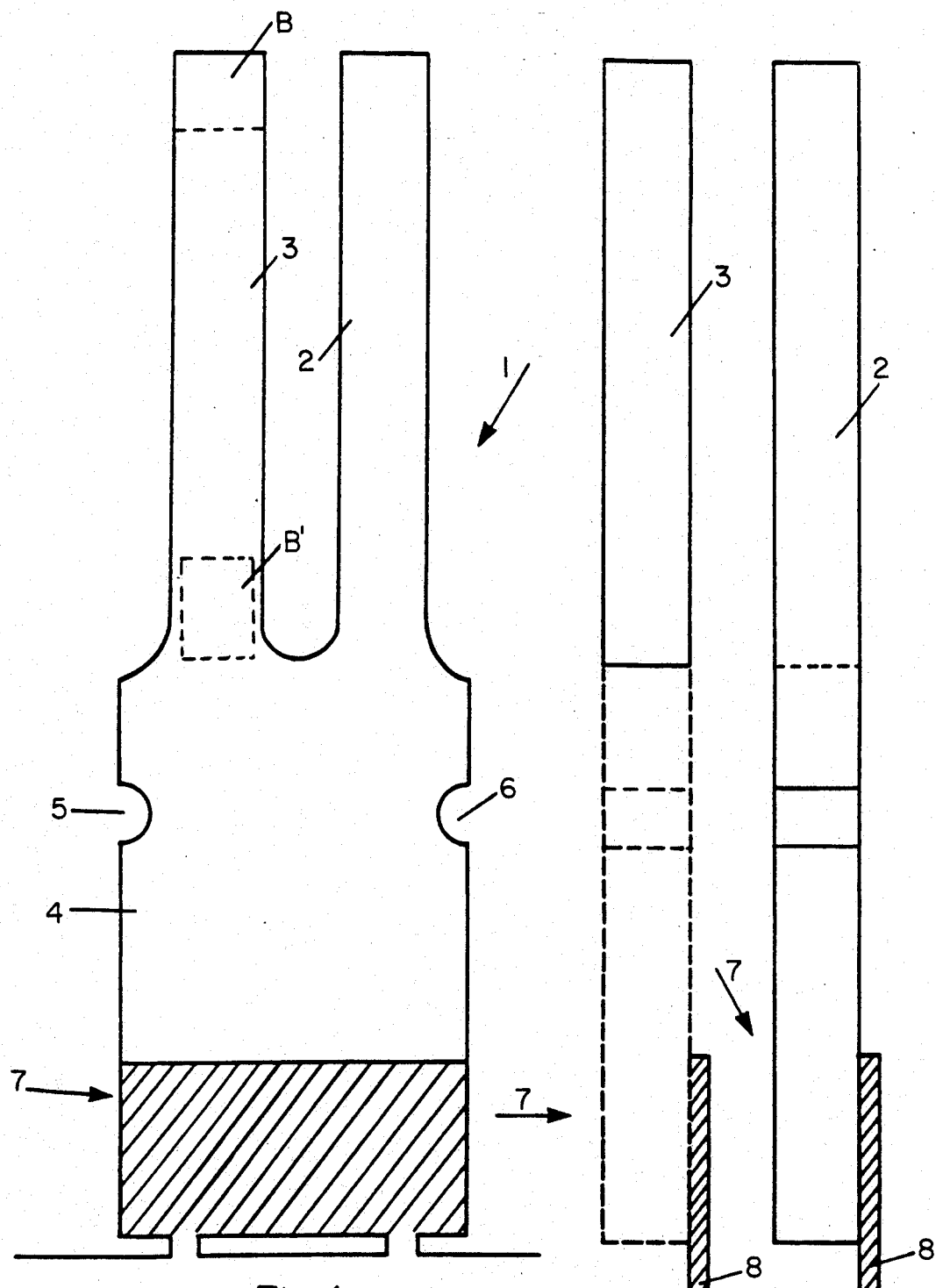
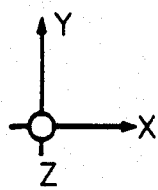
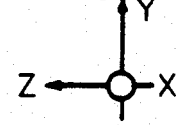
Fig. 1
Fig. 3   Fig. 2
Fig. 1a
Fig. 2a

----- = CONDUCTORS  D = DRIVE
□ = OUTPUT ISLET  S = SENSOR

PIEZOELECTRIC SENSOR ELEMENT INTENDED FOR A GYRO

FIELD OF THE INVENTION

The present invention relates to a sensor element intended for a gyro.

BACKGROUND OF THE INVENTION

It is previously known in this art to utilize rotating masses as sensor elements for gyros. However, such gyros are technically complex and, in recent years, various types of gyros based on torsion and vibration have, therefore, been designed.

Torsion-sensing gyros normally utilize vibrating tines connected to a transitional portion which, in turn, is secured to its ambient surroundings. The transitional portion plays an active part in the torsion oscillation generated by Coriolis forces. An example of such a torsion-sensing gyro is described in U.S. Pat. No. 4,524,619.

Vibration-sensing gyros are based either on a vibrating cylinder structure or on vibrating elongate bodies. For these types of gyros, the transitional portion primarily has a vibration-insulting effect.

There is a need in this art for gyros with sensor elements which display high g-force resistance. It is of the utmost importance that the various parts of the gyro withstand severe environmental stresses, in particular high acceleration stresses when the gyro is used in, for instance, ammunition units (missiles, projectiles, grenades etc.) with high muzzle velocities. The gyro must allow for a robust construction in which the gyro and its sensor elements may be of lightweight design in relation to the weakest point of each respective structure. It is essential, in respect of ammunition units, that the gyro may be capable of emitting an output signal even under the applied acceleration loads. There are also often demands on small external volumes.

SUMMARY OF THE INVENTION

The main object of the present invention is to propose a sensor element for gyros which affords a solution to the above outlined problems.

The novel sensor element is preferably designed as a tuning fork of quartz crystal. The base of the tuning fork is fixedly secured, while the tines of the tuning fork are allowed to vibrate freely. Drive electrodes are deposited on the crystal, these causing the tines of the crystal to vibrate in desired directions, with the aid of the piezoelectric effect. From the base of the crystal, it is possible to connect conductors (for example with the aid of wire bonding or TAB) and, by such means, establish contact with the surrounding electronics.

The sensor element is of a design which makes for production using conventional technology in quartz oscillator manufacture. The resonance frequencies of the tines of the sensor element may be adjusted by coating different parts of the tines with a mass, for example gold. Alternatively, the removal of mass may be employed, in which event such removal is best carried out with the aid of a laser. Mounting of the crystal in its associated capsule may be effected pursuant to prior art technology, using, for instance, glue.

Preferably, the electronics associated with the above-disclosed sensor element are placed as close to the sensor element as possible, since a quartz crystal is extremely sensitive to capacitive disturbances. Consequently, hybrid electronics are to be preferred, which makes it possible to keep the volume of the gyro to a minimum. The size of the sensor element need not be greater than that of a standard conventional watch crystal. The major portion of the volume will be taken up by the electronics, even though this is of hybrid design.

In addition to solving the above-outlined problems, the novel sensor element for gyros according to the present invention may be manufactured in economically favorable manufacturing processes. The gyro as such will be operationally highly reliable and robust, in that it will withstand such factors as high acceleration forces.

BRIEF DESCRIPTION OF THE ACCOMPANYING DRAWINGS

One currently proposed embodiment of a sensor element displaying the characteristics significative of the present invention will be described in greater detail below with reference to the accompanying Drawings.

In the accompanying Drawings:

FIG. 1 is a horizontal view showing a tuning fork sensor element;

FIG. 1a shows the orientation axes X, Y and Z for the element according to FIG. 1;

FIG. 2 is a side elevation of the tuning fork according to FIG. 1;

FIG. 2a shows orientation arrows for the above-mentioned X, Y and Z axes;

FIG. 3 is a vertical view showing the design of one tine of the tuning fork according to FIG. 1;

FIGS. 8-10 show an alternative embodiement of the electrode applications in relation to that illustrated in FIGS. 5-7.

Figures 4, 4A, 4B:
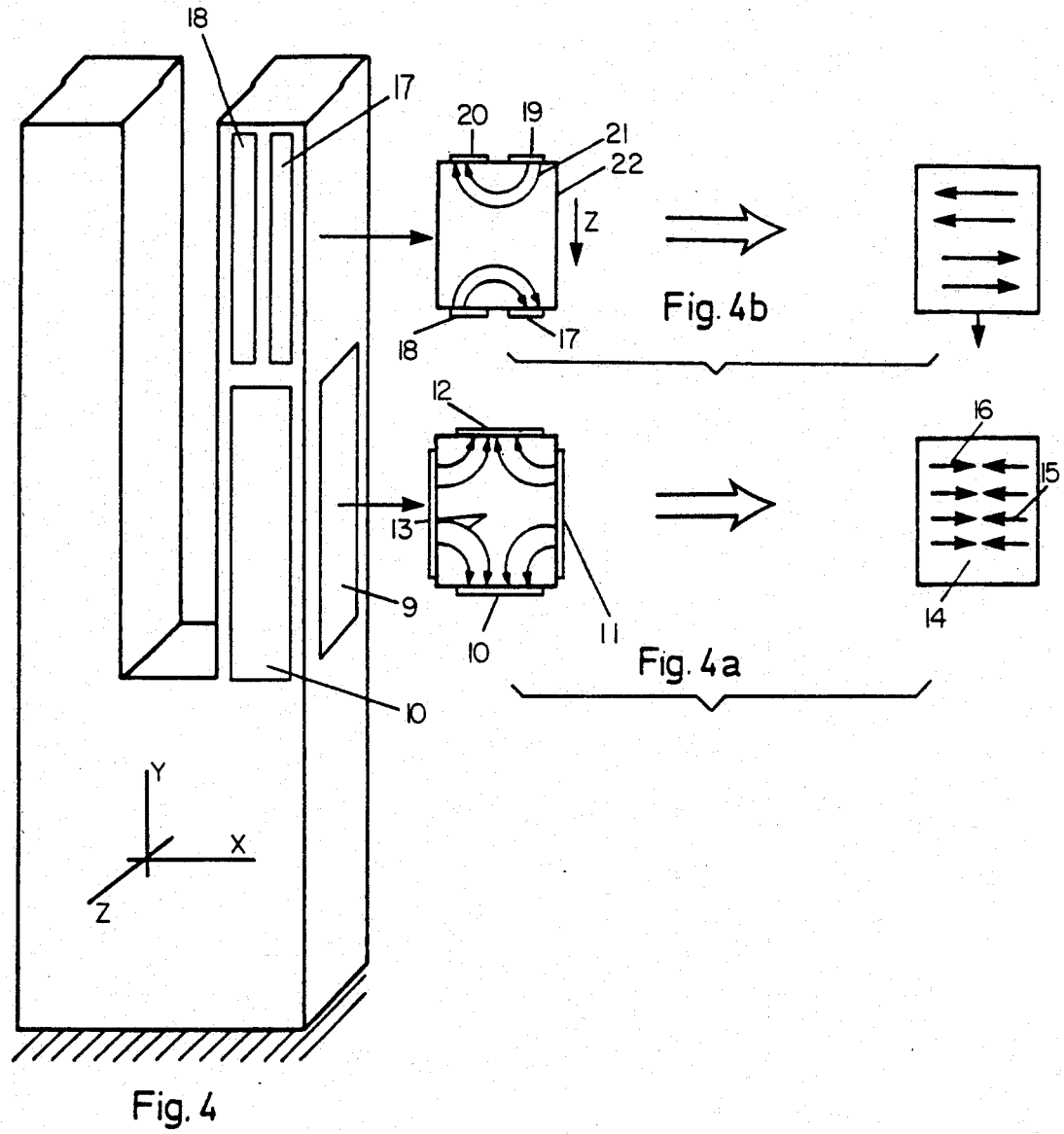
FIG. 4 shows, in perspective, example of a fork design in which the sitings of the drive and sensor electrodes on the one tine are illustrated.
FIG. 4a is a schematic view showing the piezoelectric phenomena which occur in one tine on activation of the drive electrodes according to FIG. 4.
FIG. 4b is a schematic diagram showing the piezoelectric phenomena for the sensor electrodes on the tines.

Referring to the Drawings, FIG. 1 shows the fundamental makeup (the geometry) of a sensor element 1. The element includes two tines 2, 3. In this case, the cross-sectional area of the tines is constant throughout the entire lengh of the tines. However, it is also possible to design the tines with varying cross-sectional area. The tines are fixedly connected to the base 4 of the tuning fork. This consists, for the greater part, of a rectangular structure. The entire sensor element with the tines 2, 3 and the base 4 is produce from a single piezoelectric pieces. For example, use may be made of prior art quartz crystal technology for its production, which implies that the tuning fork will be given constant thickness for both the tines and the base according to FIGS. 2 and 3. Recesses 5, 6 or corresponding projections may be introduced on the base for achieving vibration insulation of the anchorage surfaces from the vibrations of the tines.

Crystallographically, it is to be preferred that the tines point along the piezoelectric mechanical axis, the Y axis in FIG. 1a. The thickness of the tuning fork should extend in the optical axis, as constituted by the Z axis in FIGS. 1a and 2a. The width of the tines will then be deposited in the electrical direction, along the X axis in FIGS. 1a and 2a. The X and Z axes can also change place, but in the remainder of this specification, it will be assumed that the tuning fork lies in the X-Y plane. Minor variations in water cutting angle and orientation of the tuning fork may be preferable in order, for instance, to influence temperature properties and mechanical coupling between the eigenmodes of the tuning fork.

The tuning fork is coated with a suitably selected electrode configuration in order to make possible excitation of a vibration of the tines in the X-Y plane. Sensor electrodes for sensing a tine vibration in the Y-Z plane should also be deposited on the tines. Output pads/bond pads/contact material utilized for establishing electric contact with the ambient surroundings are deposited on the base of the crystal. The electrodes and their output pads are connected by means of conductors on the tuning fork. The application of the electrodes, conductors and output pads may be effected by employing prior art technology from quartz manufacture.

The crystal is mounted via an anchorage portion 7 on a securement device 8, for instance by gluing. Naturally, the anchorage portion may be fixedly retained by other means than gluing. That part of the base of the tuning fork which is counter-directed in relation to the tines is preferably employed as gluing surface. Alternatively, the sides of the base could be used as gluing surface. The output pads are electrically connected to the surroundings with the aid of wire bonding, TAB (Tape Aided Bonding), a conductive glue or the like. It could be an advantage in the electrical connection if all output terminals were located on one side of the base. One alternative method of mounting the crystal in place is to clamp the anchorage portion of the base fixedly between two plates.

The design of the base is preferably selected in such a manner that the vibrations of the tines do not influence that portion of the base which is employed for mounting. For example, the output pads should be placed on or in the proximity of that part of the base which is employed for the anchorage, in order that bonding wires and the like do not have a damping effect on the oscillatory movements of the tines. If the base were to participate in the vibration of the tines to an unacceptably high degree ('parasitic oscillation'), there is a risk of energy losses within the mounting area. Moreover, external vibrations could easily reach the tines and thereby generate a false gyro signal.

In order to minimize the effect of ambient vibrations on the vibration of the tuning fork, and in particular on the output signal, it is of the utmost importance that the tuning fork and its anchorage be designed as symmetrically as possible.

The output signal from the sensor element or sensor derives from the following physical phenomena; using suitable electronics and electrode patterns, a vibration is generated in the tines, in the X-Y plane. The amplitude of this vibration is kept constant. Its frequency is selected equal to one of the resonance frequencies of the tines. The frequency selected should imply that the tines oscillate in opposition, that is the end points of the tines move towards one another during half of the period time and away from one another during the other half. When the tuning fork is rotated about the Y axis, Coriolis forces will occur which generate a driving force which strives to excite the vibration in the Y-Z plane. That vibration which is generated in the Y-Z plane will have an amplitude which is directly proportional to the impressed rotation velocity. Just as in the vibration in the X-Y plane, the tines will, in this vibration, move in opposition to one another. The resulting vibration in the Y-Z plane is detected with the aid of electrodes which are sensitive only to vibrations in this plane. By signal processing and demodulation, a DC signal will be obtained whose size is directly proportional to the impressed rotation. Alternatively, the resulting vibration may be detected electrostatically.

In order to obtain a large output signal, it is of the utmost importance to select resonance frequencies for the two vibrations which are almost identical with one another. The reason why coinciding resonance frequencies are not desirable is that temperature variations would imply that the resonance frequencies drift somewhat from one another. These variations are small, but sufficient to change the phase of the sensor vibration in an unacceptable manner. This may be remedied by chosing the resonance frequencies to differ to such an extent that temperature variations have no appreciable effect on the sensor vibration.

Manufacturing inaccuracy for the tines will result in an inaccuracy in the resonance frequencies which is greater than the desired frequency difference between the two utilized resonance frequencies. Hence, adjustment of the resonance frequencies will be warranted such that the desired frequency difference is obtained. This adjustment may be effected in that mass is added to or removed from appropriately selected points on the tines. The technology for carrying out such application or removal of mass, respectively, may be considered as well known to a person skilled in this art. Since the frequency difference is to be adjusted, such balancing should preferably only influence one of the two resonance frequencies. For example, mass may be applied at a point where the vibration of one of the resonance frequencies has a node. Since the vibration out of the plane affects the base of the tuning fork more than does the vibration in the X-Y plane, a suitable region from this point of view is the transitional area between the base and tines. In this balancing, mass should be applied symmetrically on the tines in order that no imbalance occurs.

Those electrodes 9, 10, 11 and 12 which are employed to cause the tines of the crystal to vibrate in the X-Y plane are connected to suitable drive electronics. Such electronics applies a sinusoidal electric voltage across the drive electrodes. The electronics are adapted in relation to the crystal such that the frequency of the signal agrees with a suitable resonance frequency. One proposed electrode configuration for this vibration is depicted in FIG. 4a. This configuration generates a field 13 in the cross-sectional area of the tines. Since a piezoelectric material such as quartz is insensitive to fields in the Z axis, the generated field in the above-outlined electrode configuration may be assumed to be equivalent to an electric field 15, 16 illustrated in the cross-section 14. This latter field generates an elongation strain in the Y axis in one portion of the tine and a shrinkage in the other. The tine will then strive to bend in the X-Y plane. Since the electrical supply voltage is time-dependent, the field in the cross-section of the crystal will also be time-dependent, and thereby the movement of the tines of the tuning fork. The vibration in the X-Y plane is generated in this manner.

In a manner corresponding to the vibration in the X-Y plane, an electrode configuration 17, 18, 19 and 20 may be employed which is only sensitive to vibrations out of the plane of the tuning fork. These electrodes 17–20 are utilized to sense a time-varying deflection in this vibration direction. When vibration exists, the piezoelectric crystal structure will be deformed. This results in surface and volume changes being generated. These charges will together with the proposed electrode configuration, create a field pattern 21 in the cross-section 22. This field pattern causes electrons to migrate to and from the electrodes. A current whose value is dependent upon the relevant vibration amplitude in the Y-Z plane will thus be created.

The illustrated electrode configuration constitutes but one example. Other electrode configurations than those described in the foregoing may be employed to obtain the desired function.

When the crystal is mounted, there will be, because of shortcomings in manufacture, a coupling between the two vibration directions. This results in an output signal being present from the sensor electrodes even if the sensor is not subjected to any rotation. This "cross-talk" is undesirable, since it impairs the performance of the gyro (for example its temperature stability). One method of eliminating this link between the two vibration directions is to balance one of the tines in such a manner that the tines will have identical vibration properties. Such balancing is effected, for instance, on the tines in the regions B or B' in FIG. 1.

In order that the sensor be capable of withstanding extremely severe mechanical stresses such as powerful acceleration, its structure must be robust. Thus, the structure may not include any flimsy details. All unnecessary parts of the structure should be removed. Those parts which must be included are the tines, in order to be able to generate the reference vibrations (in the X-Y plane) which creates the Coriolis force. These tines must be anchored somewhere. Hence, the base of the sensor is also indispensible. This vibration which the Coriolis force generates must also be sensed. This may be effected by integrating a mechanical part with the sensor (torsion sensing). Since the number of parts of the sensor is preferred to be kept to a minimum, it is, however, that sensing of the vibration be essentially effected on that sensing of the vibration be essentially effected on those tines which are employed to generate reference vibrations, in those regions where the mechanical stress, caused by the sensor vibration, is the greatest. The total length of the sensor is at most about 6 mm and a maximum thickness not exceeding about 0.6 mm.

To be able to utilize the tines for both driving and detecting, it is necessary that both of the electrode configurations required for these two vibrations share the space available on the tines. The electrodes must then be optimized to the available space. Electrodes far out on the tines have a low level of efficiency, while electrodes further in on the tines have a higher level of efficiency. If the drive electrodes and the sensor electrodes were allowed to cover identical areas, then the amplitude in the drive direction would be the largest. If good performance is required of the electrodes utilized for the electrical driving, in order to simplify the requirements placed on the drive electronics, these electrodes must be placed proximal to the transition between base and tine. If it is required that performance of the two electrode configurations should not show an excessive discrepancy, the sensor electrodes should be placed near the transitional portion 23, 23' between base and tine.

The size of the drive electrodes is then selected such that desired performance is obtained in respect of the electronics. This electrode sitting is to be preferred, because the sensor electrodes may then also be permitted to cover a part of the transitional portion between base and tine and thereby make use of the fact that a portion 23, 23' of the base is actually vibrationally active during the sensor vibration of the tines.

Figure 5:
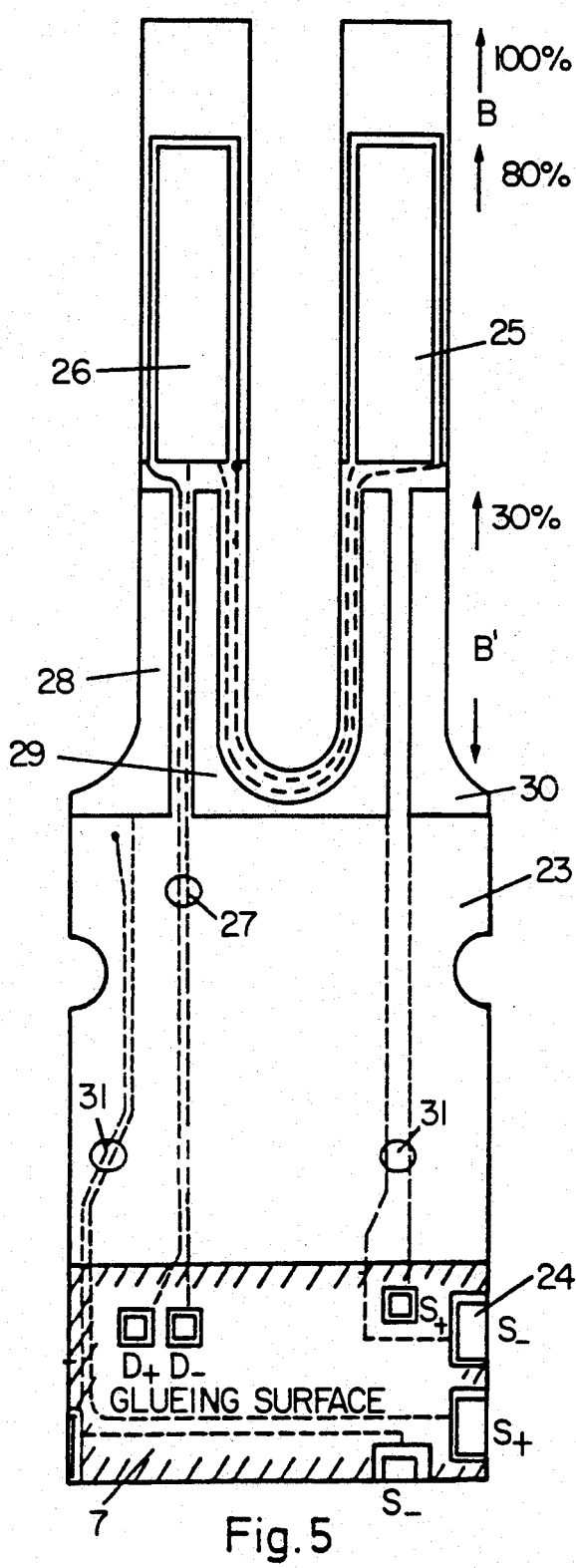
FIGS. 5-7 illustrate one practical design of the drive and sensor electrodes.
Figure 6:
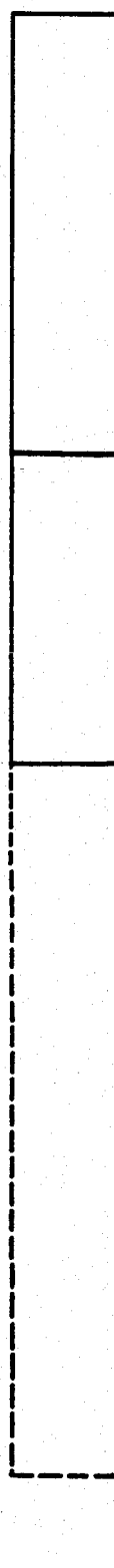
Figure 7:
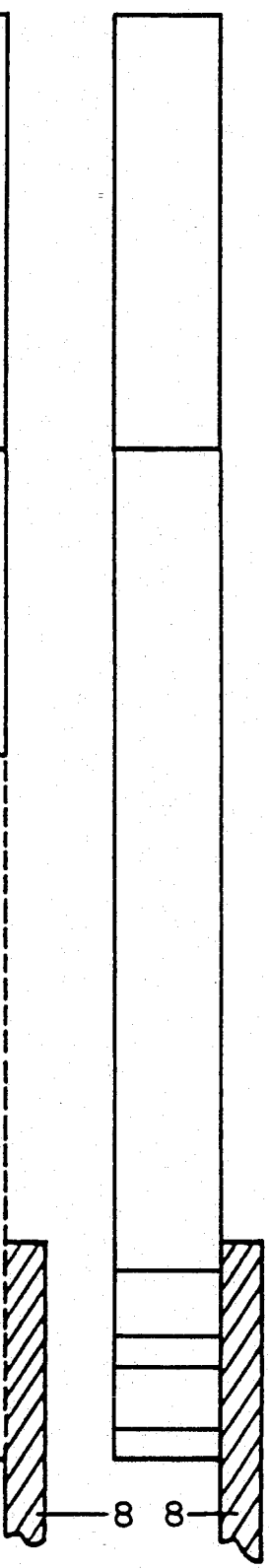
Figure 8:
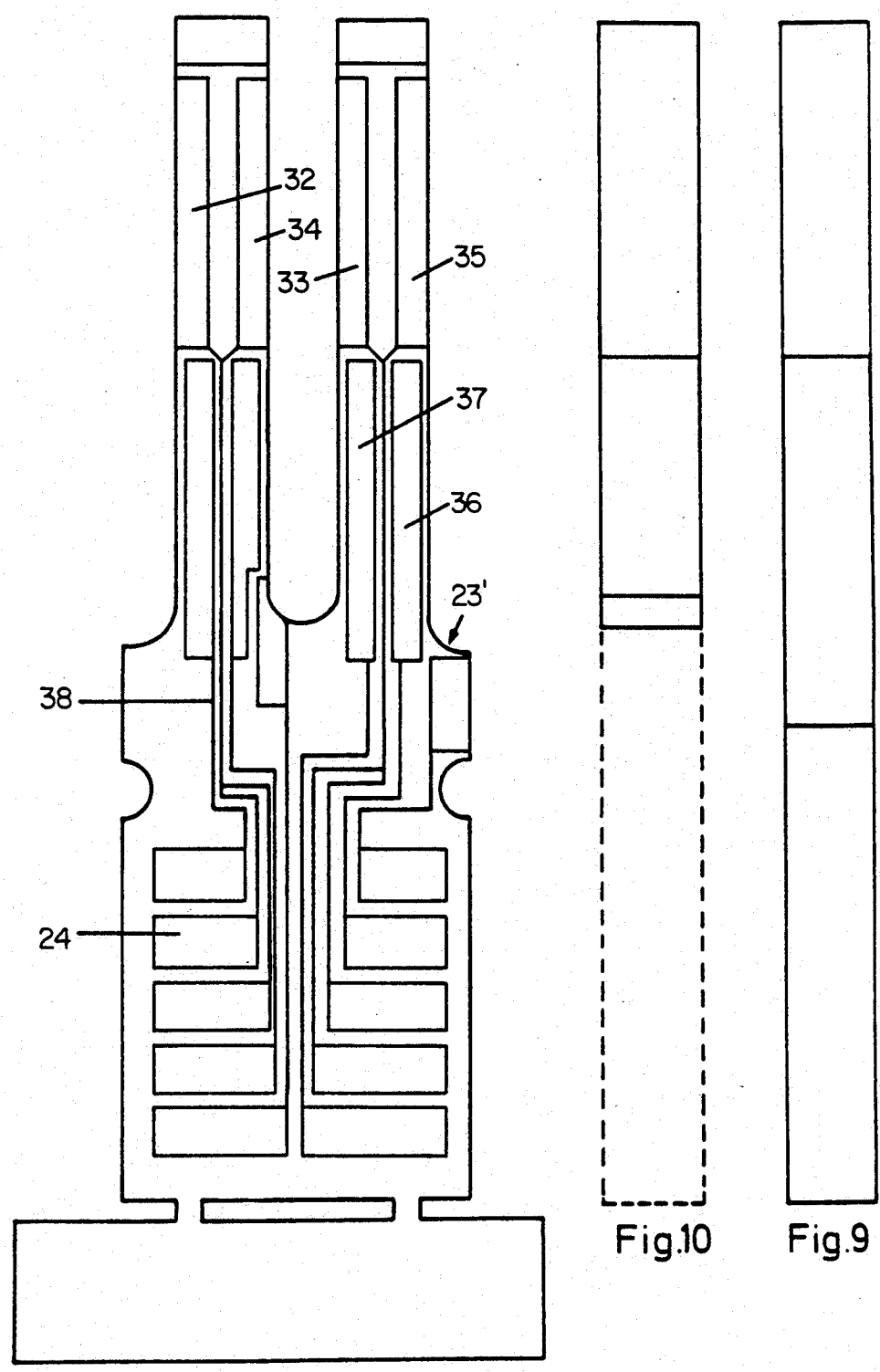
Figure 8A:
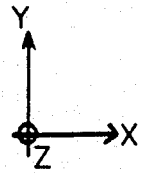
Figure 9A:
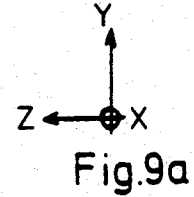

An electrode pattern which relates to the above-described division of the tines is included in FIGS. 5, 6 and 7. This pattern should only be seen as one conceivable way of realizing the above concept. FIGS. 8, 9 and 10 show a corresponding pattern if the drive and sensor electrodes change place. In the first FIGS. 5, 6 and 7, the conductors have been placed with a view to minimizing the number of output pads 24 and placing all output pads on one side of the tuning fork. When the sensor electrodes are placed most proximal the base, the borderline between drive and sensor electrodes should be placed at a distance of between 20 per cent and 40 per cent of the tine length from the base. In FIGS. 8, 9 and 10, the output pads (connection material) are greater in number.

In FIGS. 5, 6 and 7, the region of between 30 and 80 per cent of the tine length, counting from the base, is covered with drive electrodes on all side surfaces of the tines. In FIG. 5, two of the drive electrodes have been designated with reference numerals 25 and 26. The drive electrodes are connected to contact pads 24 by the intermediary of conductors 27. In order to minimize disturbance to and from the conductors, these have been paired together such that the disturbance field emanating from them is of a dipolar nature. The sensor electrodes 28, 29 and 30 are connected to their connection pads by conductors 31. The sensor electrodes are disposed on both sides of the sensor. The contact pads may be disposed either on one side of the sensor or on both sides thereof.

In FIGS. 8–10, the sensor electrodes 32, 33, 34 and 35 are located furthest out on the free ends of the tines. Two mutually opposing sides of the tines are coated with sensor electrodes, of which only one side is shown in FIG. 8. In this case, the drive electrodes are located at the bottom of the tines and extend down over parts of the transitional portion 23'. In this case, one pair of drive electrodes 36, 37 is employed on each tine surface. The connections to the contact pads 24 are effected by the intermediary of conductors 38. The contact pads 24 according to FIG. 8 cover large parts of the anchorage portions on the sensor element.

Figure 11:
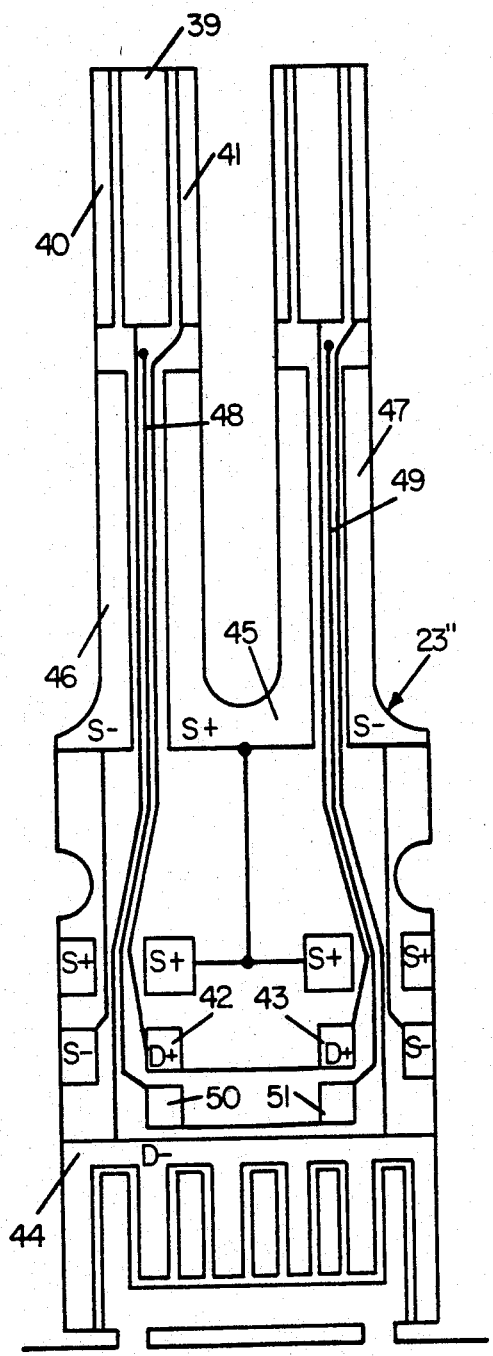
FIGS. 11-12 shows yet a further embodiment of the electrode application.
Figure 12:
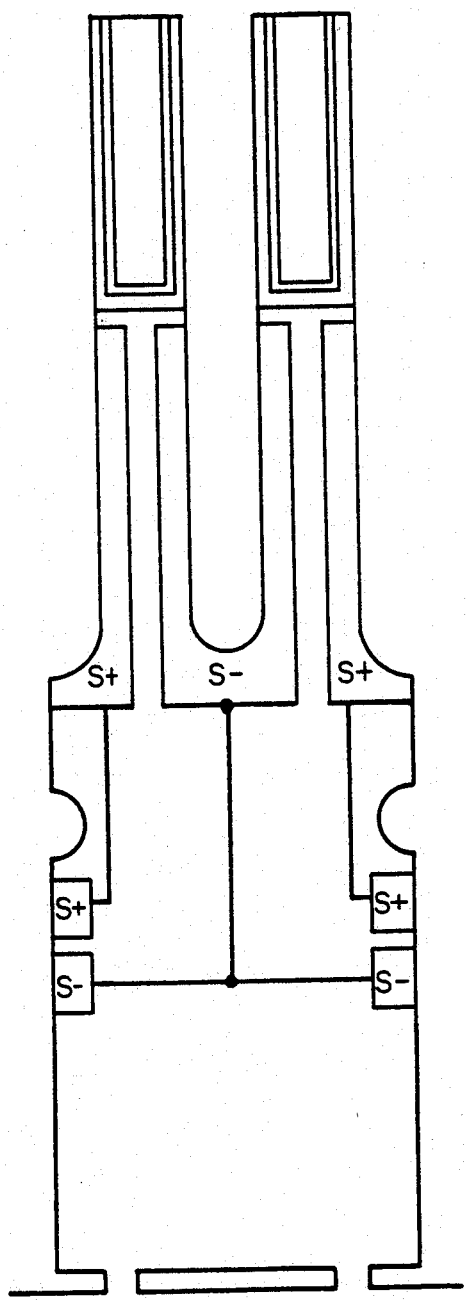

FIGS. 11 and 12 illustrate yet a further variation on the location of the sensor and drive electrodes on the tuning fork, partly from the front face (FIG. 11), and partly from the rear face (FIG. 12).

In this case, the drive electrodes 39, 40, 41 are placed furthest out on the free ends of the tines on both the front and rear faces. The electrodes 40 and 41 are deposited as side electrodes. The drive electrodes are connected to contact pads 42, 43 and 44, the contact pad 44 being designed as a capacitor.

The sensor electrodes 45, 46, 47 are disposed at the bottom on the tines and extend down over parts of the transitional portion 23". The sensor electrodes are placed on both the front and rear face and are connected each with their respective contact pads S+, S− by the intermediary of conductors.

Two dummy conductors 48, 49 for compensation of stray capacitances are disposed on the front face of the tuning fork and extend from the tines in the region between the drive and sensor electrodes to contact pads 50, 51 on the base of the tuning fork.

The above-considered structures are based on the so-called tuning fork principle. However, there is nothing to prevent a tuning fork from being designed so as to include but a single tine. Its function will be identical. Also in such a case, the tines will include electrodes for both driving and detecting. However, the advantage inherent in a tuning fork comprising two tines is that the vibrations in the two vibration directions are more localized to the tines as compared with if only one tine had been employed. Hence, influence on the gyro from its surroundings will be less if two tines are employed. Naturally, systems including more than one tuning fork may also be designed.

Those resonance frequencies which are utilized are directly proportional to the resulting mechanical strength of the tines. Thus, the frequency employed may not be too low. If a high resonance frequency is employed, the sensitivity to external vibrations of the sensor will, at the same time, be reduced.

The present invention should not be considered as restricted to the embodiment described in the foregoing and shown on the Drawings, many modifications being conceivable without departing from the spirit and scope of the appended Claims and inventive concept as herein disclosed.

I claim:

1. A sensor element intended for a gyro, said sensor element comprising:

an elongated body including at least one elongated element defining a tine and having a first and a second end, said first end being freely vibratable in two planes perpendicular in relation to each other, designated as the X-Y plane and the Y-Z plane, said second end being fixedly secured in a body rotatable about a longitudinal axis which coincides with said planes;

drive and sensor electrodes for piezoelectrically providing and detecting vibrations of said first end, said drive electrodes providing vibrations in a plane perpendicular in relation to the plane in which said sensor electrodes detect vibrations, said latter vibrations being generated by Coriolis forces acting upon the sensor element when said sensor element is rotated about the longitudinal axis, said drive and sensor electrodes covering substantial portions of said first vibratable end of said at least one elongated element;

said at least one elongated body, at its second fixedly secured end including a transitional portion and an anchorage portion which do not participate in the vibration to any appreciable degree;

said anchorage portion including a connection means which through connectors coupled to said connection means connects said sensor element to outer electronics; and wherein said elongated body including said at least one elongated element, said transitional portion and said anchorage portion is manufactured as one common piece of piezoelectric material.

2. Sensor element as claimed in 1, including two elongated elements defining a fork construction.

3. Sensor element as claimed in claim 2, wherein the resonance frequencies of the elongated elements defining tines of said fork construction are adjusted with the aid of a balance mass or masses.

4. Sensor element as claimed in claim 3, wherein said transitional portion is designed with recesses which prevent vibration transmissions between said tines and the anchorage portion.

5. Sensor element as claimed in claim 3, wherein the balancing is effected outermost on each respective elongated element.

6. Sensor element as claimed in claim 3, wherein balancing masses are deposited on the elongated elements at a point where one of the vibrations has a node.

7. Sensor element as claimed in claim 3, wherein said elongated body displays a small outer volume with a total length of no more than 6 mm and a maximum thickness of no more than 0.6 mm.

8. Sensor element as claimed in claim 3, wherein the resonance frequency is in an excess of 30 kHz.

9. Sensor element as claimed in claim 2, wherein the design and anchorage of the fork are symmetrical so as to prevent ambient vibration from influencing the vibrations of each respective elongated element.

10. Sensor element as claimed in claim 1, wherein said elongated body displays a small outer volume with a total length of no more than 6 mm and a maximum thickness of no more than 0.6 mm.

11. Sensor element as claimed in claim 10, wherein said transitional portion is designed with recesses which prevent vibration transmissions between the elongated elements and the anchorage portion.

12. Sensor element as claimed in claim 1, wherein said connection means includes contact material or connection pads located on the anchorage portion such that outer connections are prevented from exercising a damping influence on the vibrations in said at least one elongated element defining said tine.

13. Sensor element as claimed in claim 1, wherein, said sensor electrodes are placed most proximal the base of said elongated elements, and the borderline between drive and sensor electrodes is sited at between 20 and 40 percent of each respective elongated element length from the base.

* * * * *